(12) United States Patent
Takagi et al.

(10) Patent No.: US 7,934,890 B2
(45) Date of Patent: May 3, 2011

(54) END MILL

(75) Inventors: Yuji Takagi, Akashi (JP); Seiichiro Kitaura, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 150 days.

(21) Appl. No.: 12/400,098

(22) Filed: Mar. 9, 2009

(65) Prior Publication Data

US 2009/0232610 A1 Sep. 17, 2009

(30) Foreign Application Priority Data

Mar. 13, 2008 (JP) ................................ 2008-064190

(51) Int. Cl.
*B23C 5/10* (2006.01)
*B26D 1/12* (2006.01)

(52) U.S. Cl. .......................................... 407/53; 407/63

(58) Field of Classification Search .................... 407/63, 407/54, 53, 60, 61
See application file for complete search history.

(56) References Cited

U.S. PATENT DOCUMENTS

| 3,456,316 | A | * | 7/1969 | Dawson | 407/53 |
| 4,963,059 | A | * | 10/1990 | Hiyama | 407/60 |
| 2002/0067964 | A1 | * | 6/2002 | Sekiguchi et al. | 407/63 |
| 2004/0120777 | A1 | * | 6/2004 | Noland | 407/63 |
| 2008/0089749 | A1 | * | 4/2008 | Wells et al. | 407/54 |

FOREIGN PATENT DOCUMENTS

| JP | 62-203710 | 9/1987 |
| JP | 63-62323 B2 | 12/1988 |
| JP | 3-19004 B2 | 3/1991 |
| JP | 05-49408 B2 | 7/1993 |
| JP | 07-115254 B2 | 12/1995 |
| JP | 2007-268648 A | 10/2007 |

\* cited by examiner

*Primary Examiner* — Will Fridie, Jr.
(74) *Attorney, Agent, or Firm* — Leason Ellis LLP.

(57) ABSTRACT

A plurality of chip discharge flutes are located on an outer periphery of a tip portion of the end mill body which rotates on its axis. Helix angles between the axis and the cutting edges in the chip discharge flutes, of which are at least one or more; are different from others. A cross-section perpendicular to the axis shows that a flute bottom face in a main flute portion forms a concavely curved shape from the rake face to a point where the flute bottom face, touches a web thickness circle of the end mill body, forms a linear shape, and goes toward the end mill rotating direction; and a flute bottom face in a sub-flute portion forms a linear shape, intersects with the flute bottom face in the main flute portion at an obtuse angle, goes further toward the end mill rotating direction.

4 Claims, 3 Drawing Sheets

END MILL

CROSS-REFERENCE TO RELATED APPLICATIONS

The present application claims priority under U.S.C. §119 to Japanese Patent Application No. 2008-064190, filed Mar. 13, 2008. The content of the application is incorporated herein by reference in its entirety.

TECHNICAL FIELD

The present invention relates to an end mill in which a plurality of chip discharge flutes, namely, chip discharge grooves, with cutting edges located on an outer periphery of a tip portion of the end mill body which rotates on an axis; and helix angles, between the cutting edges and the axis, are not constant. These types of end mills are called variable lead end mills.

BACKGROUND OF THE INVENTION

Concerning variable lead end mills, for example, Japanese Patent Publication No. S63-62323; Japanese Patent Publication No. H05-49408; Japanese Patent Publication No. H07-115254 and Japanese Patent Publication No. H03-19004 disclose this type of end mill, in which a plurality of cutting edges in a helical shape are threadedly located on an outer periphery of a tip portion of an end mill body; at least one or more of helix angles of the cutting edges are different from those of the other cutting edges; and these features make intervals between each cutting edge variable, in the end mill rotating direction, in one or more portions of the end mill body along the direction of its axis.

Regarding this variable lead end mill; in such portion, namely, in the portion where the intervals between each cutting edge are variable in the end mill rotating direction, the periods for raking a work piece by each cutting edge are variable, and thus the helix angles of each cutting edge are variable, too. Therefore, each cutting force of the cutting edges and/or each operating period of them are also variable. These variations prevent the end mill from periodic vibrations occurring in resonance with a natural frequency of the end mill body, i.e., the vibrations caused by the resonance can be prevented from rising.

Moreover, the inventors of the present invention also have disclosed, for example Japanese Unexamined Patent Application Publication No. 2007-268648 ("JP '648"), an end mill in which wall faces of a plurality of chip discharge flutes located on an outer periphery of a tip portion of the end mill body which rotates on its axis, face in an end mill rotating direction cutting edges are formed along the outer peripheral ridge portions of the wall faces the plurality of chip discharge flutes include flute portions which are formed in tiers, and are adjacent to each other in a peripheral direction furthermore, one or more of these chip discharge flutes include flute portions with different tiers from those of the other chip discharge flutes; and, as mentioned in the beginning of this document, the helix angles of each cutting edge in the chip discharge flutes are different from each other.

Meanwhile, as the intervals between each cutting edge of the aforementioned variable lead end mill, are variable; so the periods for raking a work piece with each cutting edge are also variable. Therefore, an amount of chips and/or a thickness of chips, generated by these cutting edges, become varied. Especially the cutting edge with a longer interval to the next cutting edge toward the end mill rotating direction side generates bulkier chips than others, and also the amount of the generated chips increases. Therefore, since this cutting edge has an increased cutting load, compared with other cutting edges, the risk that this cutting edge incurs damages will increase.

In order to control this problem, for example, JP '648 teaches an end mill in which a cutting edge with the aforementioned longer interval in an end mill rotating direction, is connected to a chip discharge flute; and the chip discharge flute includes flute portions with more tiers than the other chip discharge flutes have, and then is secured firmly to get better performance for discharging the many chips generated there.

However, a cross-section perpendicular to the axis of the end mill body, shows that a flute bottom face, namely, fillet, in the chip discharge flute is more convexly curved toward its end mill rotating direction side, compared with a portion where the flute bottom face touches a web thickness circle of the end mill body, i.e., a diameter of the circle is the web thickness of the end mill body. Therefore, this chip discharge flute is not so effective for discharging bulky chips smoothly.

On the other hand, for example, Japanese Unexamined Patent Application Publication No. 2000-52127, Japanese Unexamined Patent Application Publication No. 2001-287114, Japanese Unexamined Patent Application Publication No. 2002-126934, and Japanese Unexamined Patent Application Publication No. 2004-237366, which are not related to variable lead end mills though, disclose end mills; in which a flute bottom face in a chip discharge flute, and/or a secondary flank face adjacent to a cutting edge with the aforementioned longer interval toward an end mill rotating direction, form a center concaved recessed round shape in a cross-section perpendicular to the axis, for getting better discharge performance.

However, since shapes of the intersecting ridgeline portions become sharp, on the flute bottom face and/or on the secondary flank face, where these faces have such center concaved round shapes; the end mills with this shape tend to catch chips and/or tend to incur damage. Also, since the wall thickness, namely, the back metal of this end mill body, on the rear side of a cutting edge in the end mill rotating direction, becomes thin; declines in rigidity and/or strength of the cutting edge are risks that increase.

Therefore, if a flute shape, in which its flute cross-section shape is similar to that of such end mills, is applied to the aforementioned variable lead end mills these result in a decline in a performance for discharging large amounts of chips and/or bulky chips in a chip discharge flute of a cutting edge, and/or cutting edge damages resulting from increasing a cutting load applied to the cutting edge are the risks that increase.

The invention was made under such a background and an object thereof is to provide an aforementioned variable lead end mill in which a cutting edge has sufficient rigidity and strength to prevent it from incurring damages, and an enhanced and reliable performance for discharging large amounts of bulky chips generated by the cutting edge is made possible.

SUMMARY OF THE INVENTION

In order to solve the above problems so as to achieve such an object, the invention provides an end mill in which a plurality of chip discharge flutes in a helical shape are located on an outer periphery of a tip portion of the end mill body which rotates on its axis; walls in the chip discharge flutes facing toward an end mill rotating direction are rake faces; and cutting edges are formed along outer peripheral ridge portions on the rake faces.

The chip discharge flutes have features in which helix angle[s] between the axis and the cutting edge[s] in the chip discharge flutes of which are at least one or more, is[are] different from other helix angles between the axis and the other cutting edges in the other chip discharge flutes, and a cross-section perpendicular to the axis shows that a flute bottom face in a main flute portion, forms a concavely curved shape from the rake face to a point where the flute bottom face touches a web thickness circle of the end mill body, also forms a linear shape from around the tangent point, and goes toward the end mill rotating direction; and a flute bottom face in a sub-flute portion forms a linear shape, intersects with the flute bottom face in the main flute portion at an obtuse angle, goes further from the intersection toward the end mill rotating direction, and is connected to a flank face adjacent to the cutting edge toward the end mill rotating direction side.

In the end mill having the abovementioned configurations, a cross-section perpendicular to the axis of the end mill body shows that the chip discharge flute has a main flute portion forming a concavely curved shape and touching a web thickness circle of the end mill body, and a sub-flute portion connected to the main flute portion toward the end mill rotating direction side.

Since a large cross-sectional area can be secured as entirely the chip discharge flute in this end mill; even if a cutting edge, with a longer interval to the next cutting edge toward the end mill rotating direction side, generates a large amount of chips; the chip discharge flute can be prevented from becoming clogged. Further, since the cross-section shows that the flute bottom face forms a linear shape that goes from the tangent point, at which the flute bottom face touches the web thickness circle, toward the end mill rotating direction. The chips flow from the rake face, flow through the flute bottom face in the main flute portion which forms the concavely curved shape in the cross-section, flow along the above linear shape portion in the cross-section, and then are discharged toward the end mill rotating direction side. Therefore, a good performance for discharging the chips smoothly is available, even if the generated chips are bulky.

On the other hand, the flute bottom face in the sub-flute portion, which intersects with the flute bottom face in the main flute portion, also forms a linear shape in a cross-section. Comparing this linear shape with the convexly curved shapes in a cross-section formed as the corresponding portions of the aforementioned conventional end mills, as a larger cross-sectional area of the flute than others can be secured, this linear shape more reliably prevents an occurrence of chip clogging. Additionally, since the intersection angle between these flute bottom faces can increase, even if the chips pass beyond the intersecting ridgeline portion and flow into the sub-flute portion, the end mill is free from an occurrence of chip catching. On the other hand, in conventional end mills having a center concaved round shape as their flute bottom face shape and/or as their secondary flank face shape, this chip catching tends to occur. Also, the intersecting ridgeline portion can be free from damages by having a secured strength. Moreover, the back metal of the cutting edge located toward the end mill rotating direction side in the sub-flute portion can be made larger than those of the conventional end mills, and thus sufficient rigidity and strength of the cutting edge can be secured. Therefore, the aforementioned cutting edges with a longer interval to the next cutting edge toward the end mill rotating direction side can be free from damages, even if the cutting edges have an increased cutting load.

Additionally, a variable lead end mill; in which the helix angle[s] of the cutting edge[s] using wall[s] of the chip discharge flute[s], of which is [are] at least one or more, facing toward the end mill rotating direction as rake face[s] is [are] different from those of the others; has features that any cross-section perpendicular to the axis of the end mill body, shows that each chip discharge flute with various helix angles, has variable flute widths. Also a cross-section perpendicular to the axis of the end mill body shows that a chip discharge flute, with a wider flute width than that of other chip discharge flutes, has a longer linear portion on the flute bottom face in the sub-flute portion than that of other chip discharge flutes. Therefore, a wider flute, namely, the chip discharge flute, in which a cutting edge with a longer interval to the next cutting edge toward the end mill rotating direction side, can secure a larger cross-sectional area of the flute, and thus the chip discharge flute can be more reliably prevented from becoming clogged.

Moreover, a chip discharge flute, in which the helix angle of the cutting edge in the chip discharge flute is different from a helix angle of a cutting edge in a next chip discharge flute toward the end mill rotating direction side, has a flute in which its flute width is gradually variable across the length of the axis direction. I.e., this chip discharge flute has a form in which, in a cross-section perpendicular to the axis, the linear shape portion on the flute bottom face in the sub-flute portion becomes gradually longer toward a direction of the wider flute width along the axis. Therefore, a flute portion in which a flute width of each chip discharge flute is wider, namely, a flute portion in which a large cross-sectional area of the flute is secured to flow a large amount of chips generated by the cutting edge with a longer interval to the next cutting edge toward the end mill rotating direction side, and thus an occurrence of chip clogging is effectively prevented.

The variable end mill of the present invention mentionedabove is with the chip discharge flute in which a large amount of bulky chips, which are generated by the cutting edge with a longer interval to the next cutting edge toward the end mill rotating direction side, flows in there a large cross-sectional area thereof can be secured the chips can flow there smoothly; and thus an occurrence of chip clogging can be prevented.

Therefore, in the chip discharge flute, an intersecting ridgeline portion between the main flute portion and the sub-flute portion becomes free from damages; and then the cutting edge toward the end mill rotating direction side becomes free from damages, too. Also, a smooth cutting operation with no chattering vibration is reliably available for an extended period of time.

(where chip discharge flutes 4A are arranged in upper and lower positions for comparison with other sectional views).

Figure 1:
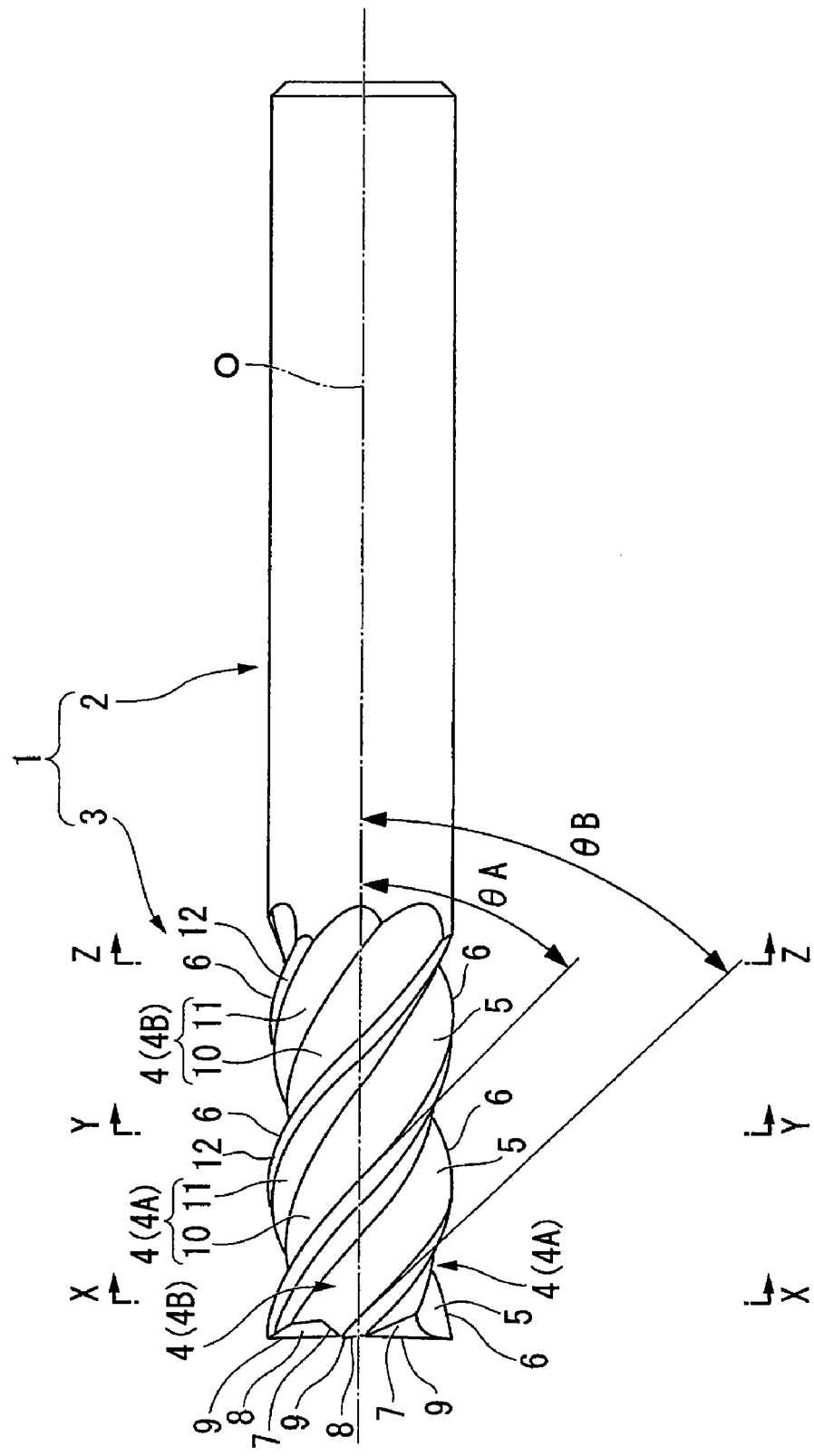
FIG. 1 is a side view showing a square end mill that is one embodiment of this invention.
Figure 3:
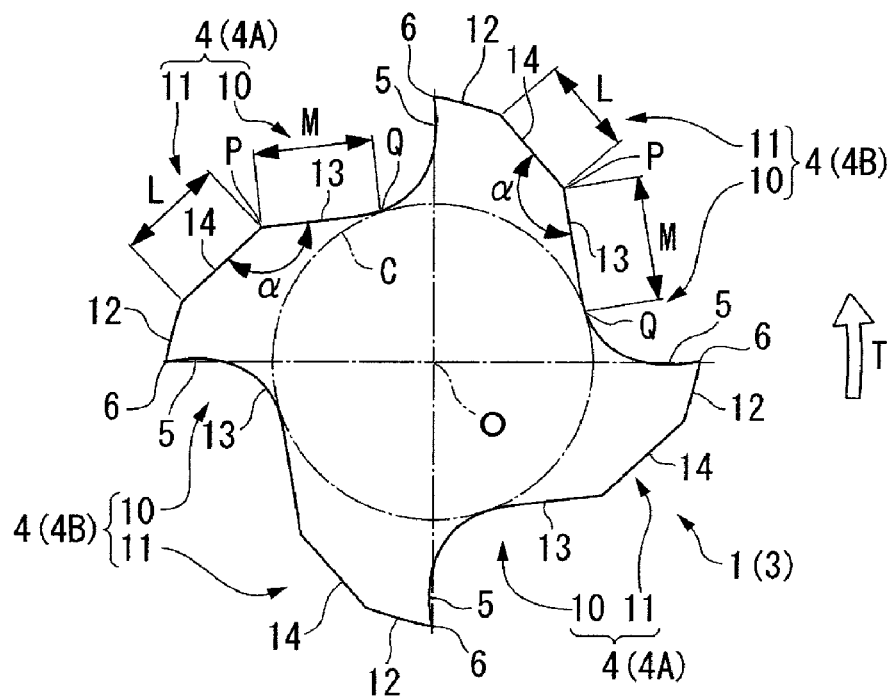

FIG. 3 is a YY sectional view in FIG. 1

(where the chip discharge flutes 4A are arranged in upper and lower positions for comparison with other sectional views).

Figure 4:
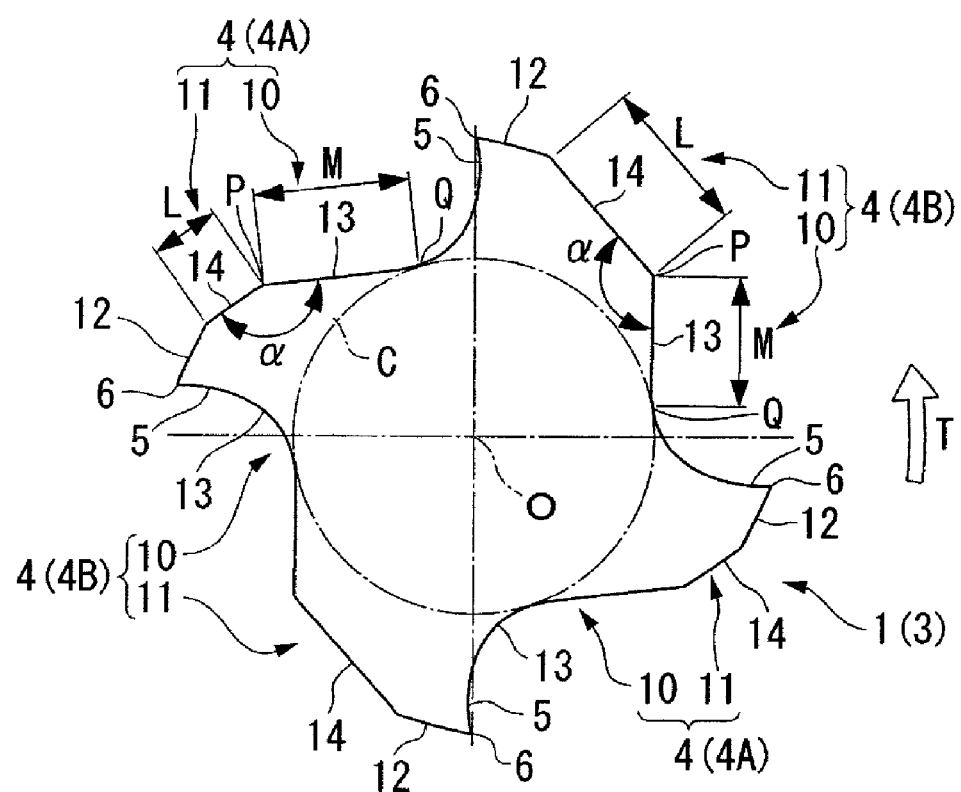

FIG. 4 is a ZZ sectional view in FIG. 1

(where the chip discharge flutes 4A are arranged in upper and lower positions for comparison with other sectional views).

DETAILED DESCRIPTION OF THE INVENTION

FIGS. 1 to 4 show an embodiment of the invention. An end mill body 1 in this embodiment is made from a hard material such as cemented carbides, is made by an integral molding process, and forms a substantially cylindrical shape having an axis O as its center. A rear end portion (a right portion in FIG. 1) of the end mill body is a cylindrical shank portion 2, and a tip portion (a left portion in FIG. 1) of the end mill body is a cutting edge portion 3. Clamping the shank portion 2 into a spindle of a machine tool, the end mill body rotates in an end mill rotating direction T on the axis O, and thus the end mill body cuts a work piece with the cutting edge portion 3.

A plurality of (four in this embodiment) chip discharge flutes 4 are located, on an outer periphery of the cutting edge portion 3, from a tip of the end mill body 1 toward the rear end side thereof, in a helical shape which goes to an opposite direction of end mill rotating direction T around the axis O, and with intervals in a peripheral direction. Wall faces of each chip discharge flute 4, in which the wall faces face in the end mill rotating direction T, are rake faces 5. Cutting edges 6, namely, outer peripheral edges, are formed along the outer peripheral ridge portions of the rake faces 5.

In the chip discharge flutes 4, the helix angle[s] between the axis O and the cutting edge[s] 6 in the chip discharge flutes 4 of which are at least one or more, is [are] different from those of the others. In this embodiment, among the four chip discharge flutes 4, a pair of chip discharge flutes 4A are located symmetrical with respect to the axis O; a helix angle θA of the cutting edges 6 in a pair of chip discharge flutes 4A, is for example 42°. In another pair of chip discharge flutes 4B, a helix angle θB of the cutting edges 6 is for example 45°. Additionally, the chip discharge flutes 4A paired with each other are located rotationally symmetrical with respect to the axis O, with a predetermined angle (180° in this embodiment). The other chip discharge flutes 4B paired with each other are located rotationally symmetrical with respect to the axis O, with a predetermined angle (180° in this embodiment). Intervals in the peripheral direction, with which the respective cutting edges 6 are located, are constant at a middle position of the cutting edge portion 3 on the axis O, namely, in a cross section at YY in FIG. 1.

In this embodiment, end gashes 7 are formed at the tip portions of the walls facing in the end mill rotating direction T, in each chip discharge flute 4 and end cutting edges 9; are located along intersecting ridgeline portions between the end gashes 7 and end face 8, namely, end flank faces of the end mill body 1, form a linear shape, intersect with the cutting edges 6 practically perpendicularly at tip points thereof, and go along by a plain perpendicular to the axis O or toward the inner peripheral side at a predetermined concavity angle.

Therefore, the end mill of this embodiment is a square end mill, in which both a longitudinal wall parallel to the axis O and a bottom face perpendicular to this longitudinal wall can be formed.

Meanwhile, each chip discharge flute 4 is composed of, a main flute portion 10 which is located toward the end mill rotating direction T side on the rake face 5, and a sub-flute portion 11 which is located toward the end mill rotating direction T side in the main flute portion 10 and is connected to the main flute portion 10. Flank faces 12, namely, an outer peripheral flank, which is adjacent to the cutting edge 6 connected to the rake face 5 toward the end mill rotating direction T side, is located further toward the end mill rotating direction T side in the sub-flute potion 11. In addition, flank angles of the cutting edges 6, which are between each flank face 12 and each cutting edge 6, are equal to each other. Furthermore rake angles of the cutting edges 6, which are between each rake face 12 and each cutting edge 6, are a positive angle and are also equal to each other.

Figure 2:
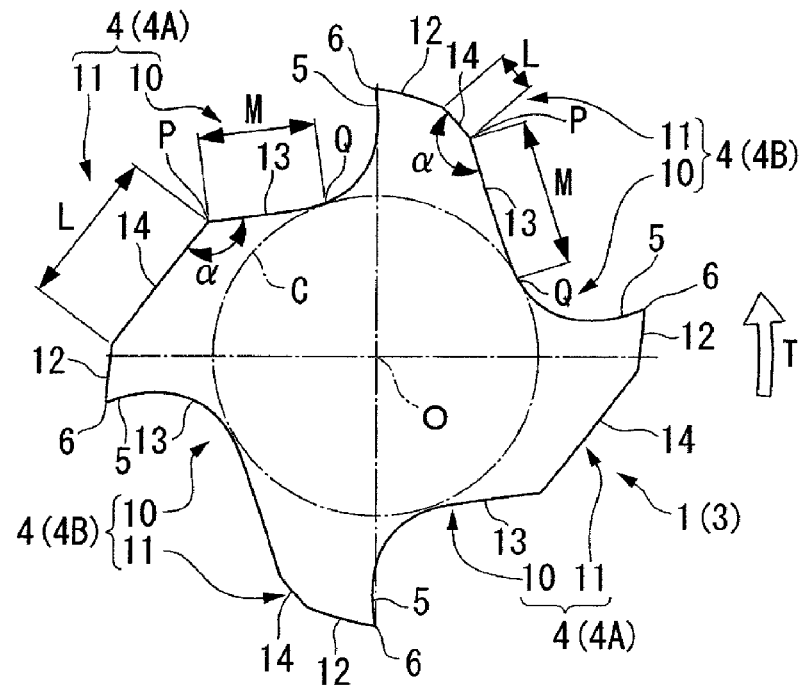
FIG. 2 is an XX sectional view in FIG. 1

Cross-sections perpendicular to the axis O, shown in FIGS. 2 to 4, show that the flute bottom face 13 in the main flute portion 10 goes continuously with a concavely curved shape from the rake face 5 having aforementioned positive rake angle toward the inner peripheral side, goes further toward the end mill rotating direction T, touches a web thickness circle C of the end mill body 1 within the cutting edge 3 portion, and then goes further from the tangent point Q toward the outer peripheral side in the end mill rotating direction T. Additionally, a portion, where the tangent point Q goes toward the end mill rotating direction T, in the cross-sections, forms a linear shape connected smoothly to the portion with a concavely curved shape. Furthermore, the flute bottom face 14 in the sub-flute portion 11, in the cross-sections, also forms a liner shape intersecting with the linear portion of the flute bottom face 13 in this main flute portion 10, at an obtuse angle.

As the helix angles θA and θB of the cutting edges 6 are different; the flute widths of both the chip discharge flutes 4A and 4B, are located between two cutting edges 6 adjacent to each other, and are progressively variable across the length of the axis O direction, i.e., FIGS. 2 to 4 show that the flute width of the chip discharge flute 4A having the cutting edge 6 with the small helix angle θA, is wider than that of the cutting edges 6 with the helix angle θB, from the aforementioned middle position toward the tip side in the direction of the axis O, and becomes gradually narrower toward the rear end side; and in contrast, the flute width of the chip discharge flute 4B having the cutting edge 6 with the large helix angle θB, is wider than that of the 4A from the middle position toward the rear end side, and becomes gradually wider from the tip side toward the rear end side in the direction of the axis O.

In this embodiment, in the chip discharge flutes 4 having the variable flute width, every cross-section perpendicular to the axis O shows that, there are the chip discharge flutes 4 with a wider flute width and other chip discharge flutes 4 with a narrower flute width, and the chip discharge flutes 4 with a wider flute width has a longer linear portion its length L than that of other chip discharge flutes 4 with a narrower flute width, on the flute bottom face 14 in the sub-flute portion 11; excepting one cross-section located at the middle position of the cutting edge portion 3 on the axis O, where the intervals of the cutting edges 3 in the peripheral direction are constant.

Therefore, FIG. 2. shows that the length L, in the chip discharge flute 4A with a wider flute width toward the tip side in the direction of the axis O, is longer than that of 4B at the same position in the direction of the axis O. In contrast, FIG. 4. shows that the length L, in the chip discharge flute 4B with a wider flute width toward the rear end side in the direction of the axis O, is longer than that of 4A at the same position in the direction of the axis O.

In addition, in this embodiment, the cross-section perpendicular to the axis O shows that a length M, namely, a length in a linear shape portion, which goes from approximately the tangent point Q on the flute bottom face 13 in the main flute portion 10, is, in contrast to the above, slightly shorter in the chip discharge flutes 4 with a wider flute width, than that of other chip discharge flutes 4 with a narrower flute width; moreover an intersection angle α, namely, an angle of the intersection point P, between the flute bottom face 13 in the main flute portion 10 and the flute bottom face 14 of the sub-flute portion 11, is smaller in the chip discharge flutes 4 with a wider flute width, than that of other chip discharge flutes 4 with a narrower flute width.

However, at the middle position of the cutting edge portion 3 where flute widths are constant to each other in the chip discharge flutes 4, the lengths L, the lengths M and the intersection angles α are respectively, approximately constant to each other. Therefore, at the middle position, the chip discharge flutes having almost a same dimension and almost a same shape to each other, are located with a constant interval in the peripheral direction. Additionally, the intersection angle between the flute bottom face 14 in the sub-flute portion 11 and the flank face 12 of the cutting edge 6, is approximately equal and constant, in any of the chip discharge flutes 4A and 4B, and at any position across the length of the axis O.

On the other hand, in each chip discharge flute 4, the cross-section perpendicular to the axis O shows that the length L of the linear shape portion on the flute bottom face 14 in the sub-flute portion 11, becomes gradually longer in the direction of the axis O toward a side where the chip discharge flutes 4 have a wider flute width. Therefore, the length L becomes gradually longer toward the tip side, in the chip discharge flute 4A where the flute width becomes wider toward the tip side in the direction of the axis O, and the helix angle θA of the cutting edge 6 is small. Also, the length L becomes gradually longer toward the rear end side, in the chip discharge flute 4B where the flute width becomes wider toward the rear end side in the direction of the axis O, and the helix angle θA of the cutting edge 6 is large. In contrast, the length M and the intersection angle α on the flute bottom face 13 in the main flute portion 10 become gradually smaller toward the side where the flute width of the chip discharge flute 4 becomes large.

In addition, the chip discharge flutes 4A and 4B having such shapes in a cross-section, can be formed by using only one disk shaped generic flute grinding wheel having an abrasive grain layer on its cylindrical surface. That is, the flute grinding wheel should be arranged as such its outer peripheral surface having the abrasive grain layer thereon is positioned on the linear shape portion, in a cross-section, on the flute bottom face 13 in the main flute portion 10, its circumference portion at an end edge on the outer peripheral surface is positioned on the concavely curved shape portion, in a cross-section, and a plane perpendicular to the rotation axis of the grinding wheel is positioned along the chip discharge flute 4. Then, the main flute portion 10 is made; by feeding the end mill body 1 across the length of the axis O, and by synchronically rotating on the axis O, with a feed rate and a rotating speed which are corresponding to form the helix angles θA or θB of the cutting edges 6 in the chip discharge flutes 4A or 4B respectively. Next, the sub-flute portion 11 is made; by locating the outer peripheral surface having the abrasive grain layer thereon, on the flute bottom face 14 in the sub-flute portion 11, and then by a flute grinding procedure similar to the above procedure for forming the helix angles θA and/or θB of the cutting edges 6 in the chip discharge flutes 4A and/or 4B respectively.

For example, in the end mill with the above configuration that can be manufactured by the above procedure, the chips generated by the cutting edges 6, flow from the rake face 5, flow through the flute bottom face 13 in the main flute portion 10 which forms the concavely curved shape shown in the cross-section, then flow along the linear shape portion in a cross-section, and thus are discharged directly toward the end mill rotating direction side. Therefore, since the variable lead end mill, in which the chip discharge flutes 4A and 4B are variable, and the helix angles θA and θB of the cutting edges 6 are also variable even if the cutting edges 6, especially with a longer interval to the next cutting edge 6 toward the end mill rotating direction T side, generates a large amount of bulky chips; the chip discharge flute 4, where the chips flow therein, can be prevented from becoming clogged. Therefore, a good performance for discharging the chips smoothly is available.

Additionally, since the sub-flute portion 11 is located toward the end mill rotating direction T side in the main flute portion 10 and is connected with the main flute portion 10; a cross-sectional area of the chip discharge flute 4 can be made larger.

Also, the flute bottom face 14 in the sub-flute portion 11 with a linear shape in a cross-section, intersects with the flute bottom face 13 in the main flute portion 10 at an obtuse angle at the above intersection point P. Thus, as compared with, for example, a conventional end mill in which its flute bottom face forms a convexly curved shape; a larger cross-sectional area of the chip discharge flute 4 can be secured, and thus the chip discharge flute can be prevented from becoming clogged with higher reliability.

Meanwhile, for example, a conventional end mill, which features a flute bottom face and/or a secondary flank face have a center concaved round shape; and these faces intersect each other, in comparison, the intersection point P, in this embodiment, prevents the chips, which flow into the sub-flute portion 11, from being caught at this intersecting portion. Therefore, a better performance for discharging the chips smoothly is available.

Also, since the flute bottom face 13 shape in the main flute portion 10 and the flute bottom face 14 in the sub-flute portion 11, which are with a linear shape in a cross-section, intersect at an obtuse angle in a cross-section; the strength in this intersecting portion (around the intersection point P) can be improved, and thus this portion becomes free from occurrences such as damages and the like. Therefore, obstructions for discharging the chips smoothly can be removed. Additionally, as the flute bottom face 14 in the sub-flute portion 11 forms a linear shape in a cross-section, the wall thickness of the cutting edge 6, namely, the back metal, located toward the end mill rotating direction T side, can be made larger than that of others having a center concaved round shape. Therefore the cutting edge 6 becomes free from an occurrence of the damages and the like, and thus the end mill has a longer lifetime.

On the other hand, in this embodiment, every cross-section perpendicular to the axis O shows that, there are the chip discharge flutes 4 with a wider flute width than other chip discharge flutes 4, and the chip discharge flutes 4 with a wider flute width has a longer linear portion in its length L than that of other chip discharge flutes 4, on the flute bottom face 14 in the sub-flute portion 11; excepting one cross-section located at the middle position of the cutting edge portion 3, where the intervals of the cutting edges 6 in the peripheral direction are constant. Moreover, the intersection angle α, namely, the angle of the intersection point P, between the liner shape portion with the length M on the flute bottom face 13 in the main flute portion 10, and the flute bottom face 14 in the sub-flute portion 11; is smaller in the chip discharge flutes 4 with the wide flute width. Thus, such chip discharge flute 4; in which the flute width is wide, and many chips flow into there; can secure a cross-sectional area, which is larger than a difference between an area at the wide width potion and another area at the narrow width portion. Therefore, the occurrence of chip clogging can be prevented with higher reliability.

On the other hand, each chip discharge flute 4 has a form in which, across the length of the axis O the flute width of the chip discharge flutes 4 become wider, in 4A, from the rear end side to the tip side, in 4B, from the tip side to the rear end side, in this embodiment; and in a cross-section perpendicular to the axis O, a length L on the flute bottom face 14 in the sub-flute portion 11 becomes gradually longer, in this embodiment. Moreover, since the length M and the intersection angle α become gradually smaller toward a side where the flute width of each chip discharge flute 4 becomes large, this wider flute width makes a larger cross sectional area secured for each chip discharge flute 4. Therefore, this prevents chip clogging, and can prompt good smooth discharge of the chips.

In addition, in a cross-section perpendicular to the axis O, a contact point; where the flute bottom face 13 having a concavely curved shape connects to the portion having a linear shape, in the main flute portion 10; does not have to be so exactly the same on the tangent point Q where the flute bottom face 13 touches the web thickness circle C.

For example, the contact point on the flute bottom face 13 may be slightly off the tangent point Q toward the end mill rotating direction T side, i.e., the concavely curved shape portion may touch the web thickness circle C. On the other hand, the contact point on the flute bottom face 13 may be slightly off the tangent point Q toward the rear side in the end mill rotating direction T, i.e., the linear shape portion may touch the web thickness circle C.

In this embodiment, an application of the invention to the square end mill, in which the end cutting edge 9 goes in a linear shape along a plane substantially perpendicular to the axis O, is explained. However, applications of the invention to other end mills are also available, for example, a ball nose end mill in which the end cutting edge 9 is connected to the tip of the cutting edge 6 so as to form a semispherical shape in a rotational locus around the axis O; and a radius end mill in which a circular-arc corner edge is located between an outer peripheral end of the end cutting edge 9 extending in a linear shape along a plane substantially perpendicular to the axis O, and the tip of the cutting edge 6.

The invention claimed is:

1. An end mill comprising:
   a plurality of chip discharge flutes in a helical shape located on an outer periphery of a tip portion of an end mill body which rotates on an axis;
   walls in the chip discharge flutes facing toward an end mill rotating direction are rake faces; and
   cutting edges formed along outer peripheral ridge portions on the rake face:
   wherein the chip discharge flutes comprise;
   at least one helix angle between the axis and the cutting edge in the chip discharge flutes of which are at least one or more are different from other helix angles between the axis and the other cutting edges in the other chip discharge flutes, and
   a cross-section perpendicular to the axis shows that a flute bottom face in a main flute portion, forms a concavely curved shape from the rake face to a point where the flute bottom face touches a web thickness circle of the end mill body, goes toward the end mill rotating direction; and also forms a linear shape from around the tangent point, and a flute bottom face in a sub-flute portion forms a linear shape, intersects with the flute bottom face in the main flute portion at an obtuse angle, goes further from the intersection toward the end mill rotating direction, and is connected to a flank face adjacent to the cutting edge toward the end mill rotating direction side.

2. The end mill according to claim 1, wherein,
   the cross-section perpendicular to the axis of the end mill body shows that a chip discharge flute with a wider flute width than the plurality of chip discharge flutes, has a longer linear portion on the flute bottom face in the sub-flute portion than that the plurality of chip discharge flutes.

3. The end mill according to claim 1, wherein,
   a chip discharge flute comprises;
   the helix angle of the cutting edge in the chip discharge flute, is different from a helix angle of a cutting edge in a next chip discharge flute toward the end mill rotating direction side; and
   a cross-section perpendicular to the axis shows that the linear shape portion on the flute bottom face in the sub-flute portion, becomes gradually longer toward a direction of the wider flute width along the axis.

4. The end mill according to claim 2, wherein,
   a chip discharge flute comprises;
   the helix angle of the cutting edge in the chip discharge flute, is different from a helix angle of a cutting edge in a next chip discharge flute toward the end mill rotating direction side; and
   a cross-section perpendicular to the axis shows that the linear shape portion on the flute bottom face in the sub-flute portion, becomes gradually longer toward a direction of the wider flute width along the axis.

* * * * *